(12) United States Patent
Ogihara

(10) Patent No.: US 10,178,440 B2
(45) Date of Patent: Jan. 8, 2019

(54) COMMUNICATION SYSTEM, TRANSMISSION APPARATUS, RECEPTION APPARATUS, COMMUNICATION APPARATUS, COMMUNICATION METHOD, AND PROGRAM

(71) Applicant: NTT COMMUNICATIONS CORPORATION, Chiyoda-ku (JP)

(72) Inventor: Toshihiko Ogihara, Chiyoda-ku (JP)

(73) Assignee: NTT Communications Corporation, Chiyoda-ku (JP)

( * ) Notice: Subject to any disclaimer, the term of this patent is extended or adjusted under 35 U.S.C. 154(b) by 12 days.

(21) Appl. No.: 15/301,660

(22) PCT Filed: Apr. 3, 2015

(86) PCT No.: PCT/JP2015/060672
§ 371 (c)(1),
(2) Date: Oct. 3, 2016

(87) PCT Pub. No.: WO2015/152414
PCT Pub. Date: Oct. 8, 2015

(65) Prior Publication Data
US 2017/0180816 A1    Jun. 22, 2017

(30) Foreign Application Priority Data

Apr. 4, 2014  (JP) ................................. 2014-077876
Jul. 24, 2014  (JP) ................................. 2014-151146

(51) Int. Cl.
*H04L 29/00*    (2006.01)
*H04N 21/6375*  (2011.01)
(Continued)

(52) U.S. Cl.
CPC ........... *H04N 21/6375* (2013.01); *H04L 1/14* (2013.01); *H04L 1/1809* (2013.01);
(Continued)

(58) Field of Classification Search
CPC .. H04N 21/6375; H04N 19/15; H04L 1/1809; H04L 47/10; H04L 65/80
See application file for complete search history.

(56) References Cited

U.S. PATENT DOCUMENTS 5,357,525 A * 10/1994 Moriue ................. H04L 1/1803
                                                  370/360
5,761,603 A *  6/1998 Nojima ................ H04L 12/2801
                                                  348/E7.07
(Continued)

FOREIGN PATENT DOCUMENTS

JP        64-834 A      1/1989
JP     2-266728 A      10/1990
(Continued)

OTHER PUBLICATIONS

Partial Supplementary European Search Report dated Oct. 27, 2017 in European Patent Application No. 15773633.1.
(Continued)

*Primary Examiner* — Esaw T Abraham
(74) *Attorney, Agent, or Firm* — Oblon, McClelland, Maier & Neustadt, L.L.P.

(57) ABSTRACT

A communication system including a transmission apparatus and a reception apparatus, the transmission apparatus including: a buffer configured to hold first data to transmit; transmission means configured to transmit the first data to the reception apparatus; reception means configured to receive second data that the reception apparatus returns; comparison means configured to compare the second data with the first data held by the buffer; and control means configured, when a result of the comparison by the comparison means is unmatch, to instruct the transmission means to retransmit the first data.

9 Claims, 9 Drawing Sheets

(51) Int. Cl.
 H04L 1/14 (2006.01)
 H04L 12/64 (2006.01)
 H04N 19/15 (2014.01)
 H04L 1/18 (2006.01)
 H04L 29/06 (2006.01)
 H04L 12/801 (2013.01)
 H04N 21/234 (2011.01)
 H04N 21/44 (2011.01)
 H04L 29/14 (2006.01)

(52) U.S. Cl.
 CPC .... *H04L 12/6418* (2013.01); *H04L 29/06027* (2013.01); *H04L 47/10* (2013.01); *H04L 65/80* (2013.01); *H04N 19/15* (2014.11); *H04N 21/23406* (2013.01); *H04N 21/44004* (2013.01); *H04L 69/40* (2013.01)

(56) References Cited

U.S. PATENT DOCUMENTS

| | | | | |
|---|---|---|---|---|
| 5,974,101 | A * | 10/1999 | Nago | H04B 1/1036 375/148 |
| 6,961,326 | B1 * | 11/2005 | Chang | H04L 29/06 370/252 |
| 7,486,634 | B2 * | 2/2009 | Itoh | H04L 1/0003 370/230 |
| 8,005,028 | B2 * | 8/2011 | Itakura | H04L 1/1657 370/278 |
| 8,321,737 | B2 * | 11/2012 | Sasaki | H04L 1/1829 714/712 |
| 9,461,777 | B2 * | 10/2016 | Cohen | H04L 1/1841 |
| 2001/0005897 | A1 * | 6/2001 | Kawagishi | H04L 1/1809 714/748 |
| 2009/0249154 | A1 | 10/2009 | Sasaki | |
| 2012/0201193 | A1 | 8/2012 | Sugiyama et al. | |
| 2013/0188471 | A1 | 7/2013 | Bade et al. | |

FOREIGN PATENT DOCUMENTS

JP 10-308932 A 11/1998
WO 2011/048915 A1 4/2011

OTHER PUBLICATIONS

James F. Kurose, et al., "Transport Layer", Computer Networking, a top-Down Approach Featuring the Internet, Jan. 1, 2003, XP002357124, pp. 184-290.

"RFC: 793 Transmission Control Protocol; DARPA Internet Program Protocol Specification," Information Sciences Institute, University of Southern California, Sep. 1981, 90 pages.

International Search Report dated Jun. 23, 2015 in PCT/JP2015/060672 Filed Apr. 3, 2015.

* cited by examiner

COMMUNICATION SYSTEM, TRANSMISSION APPARATUS, RECEPTION APPARATUS, COMMUNICATION APPARATUS, COMMUNICATION METHOD, AND PROGRAM

TECHNICAL FIELD

The present invention relates to a data communication technique, and especially relates to a technique for efficiently performing highly reliable data communication.

BACKGROUND ART

As a protocol of data communication, TCP is widespread. TCP is a protocol that is optimized for network communication quality and speed of its birth era.

RELATED ART DOCUMENT

Non Patent Document

[NON PATENT DOCUMENT 1] RFC793

Patent Document

[PATENT DOCUMENT 1] JP H10-308932

SUMMARY OF THE INVENTION

Problem to be Solved by the Invention

However, there is a problem in that, since a checksum of a TCP header is a value of 16 bits using one's complement, its reliability is lower than that of a hash function. In a case where a hash value is added to a packet, the hash function needs to be calculated for each packet, so that CPU load becomes high.

Also, there is a problem in that, as to TCP, the overhead is too large for a current high-quality and high-speed network of digital transmission by an optical fiber. In TCP, since a transmission side inevitably waits for ACK that is transmitted from a reception side, the transmission side cannot transmit a packet unless it receives ACK or a time-out occurs. Especially, a communication of physically remote distance is directly affected by delay in the network.

Also, as to TCP, due to property of band control based on window size (bandwidth delay product), there is a problem in that efficiency of data communication deteriorates so that high throughput cannot be obtained.

The present invention is contrived in view of the above-mentioned points, and an object of the present invention is to transfer data with high reliability. Also, an object of the present invention is to transfer data at high speed.

Means for Solving the Problem

According to an embodiment of the present invention, there is provided a communication system including a transmission apparatus and a reception apparatus,
the transmission apparatus including:
a buffer configured to hold first data to transmit;
transmission means configured to transmit the first data to the reception apparatus;
reception means configured to receive second data that the reception apparatus returns;
comparison means configured to compare the second data with the first data held by the buffer; and
control means configured, when a result of the comparison by the comparison means is unmatch, to instruct the transmission means to retransmit the first data.

According to an embodiment of the present invention, there is provided a transmission apparatus including:
a buffer configured to hold first data to transmit;
transmission means configured to transmit the first data to a reception apparatus;
reception means configured to receive second data that the reception apparatus returns;
comparison means configured to compare the second data with the first data held by the buffer; and
control means configured, when a result of the comparison by the comparison means is unmatch, to instruct the transmission means to retransmit the first data.

According to an embodiment of the present invention, there is provided a reception apparatus including:
reception means configured to receive first data from a transmission apparatus; and
transmission means configured to return the received first data to the transmission apparatus as second data to cause the transmission apparatus to compare the second data with the first data.

According to an embodiment of the present invention, there is provided a communication method performed by a transmission apparatus and a reception apparatus, including:
a step of transmitting first data to the reception apparatus;
a step of receiving second data that the reception apparatus returns;
a step of comparing the second data with the first data; and
a step of, when a result of the step of comparing is unmatch, retransmitting the first data,
which are performed by the transmission apparatus.

According to an embodiment of the present invention, there is provided a communication system including a first communication apparatus and a second communication apparatus, wherein
the first communication apparatus transmits first data to the second communication apparatus;
the second communication apparatus transmits, to the first communication apparatus, third data obtained by superimposing second data on the first data received from the first communication apparatus; and
the first communication apparatus obtains the second data from the third data received from the second communication apparatus by using the first data that is held by the first communication apparatus.

According to an embodiment of the present invention, there is provided a communication method in a communication system including a first communication apparatus and a second communication apparatus, including:
a step in which the first communication apparatus transmits first data to the second communication apparatus;
a step in which the second communication apparatus transmits, to the first communication apparatus, third data obtained by superimposing second data on the first data received from the first communication apparatus; and
a step in which the first communication apparatus obtains the second data from the third data received from the second communication apparatus by using the first data that is held by the first communication apparatus.

According to an embodiment of the present invention, there is provided a communication apparatus configured to perform communication with a partner communication apparatus that becomes a communication partner, including:

means configured to transmit first data to the partner communication apparatus, and receive, from the partner communication apparatus, third data obtained by superimposing second data on the first data;

storage means configured to hold the first data transmitted to the partner communication apparatus; and data obtaining means configured to obtain the second data from the third data received from the partner communication apparatus by using the first data that is held in the storage means.

Effect of the Present Invention

According to an embodiment of the present invention, data can be transferred with high reliability. Also, according to an embodiment of the present invention, data can be transferred at high speed.

EMBODIMENTS FOR CARRYING OUT THE INVENTION

In the following, as embodiments of the present invention, a first embodiment and a second embodiment are described. In the first embodiment, a basic technique for transferring data with high reliability is described. In the second embodiment, a technique applying the basic technique in the first embodiment is described.

First Embodiment

First, the first embodiment is described with reference to figures. In the first embodiment, as an example of "data", "packet" is mainly used.

Figure 1:
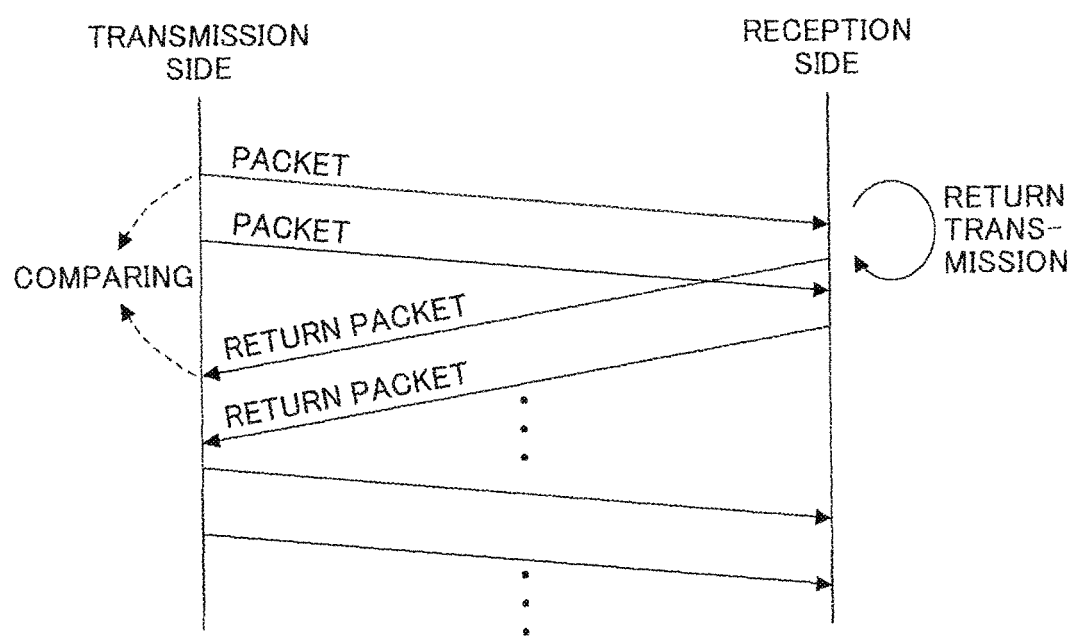
FIG. 1 is a schematic diagram for explaining a situation where a communication system of a first embodiment transmits and receives a packet.

FIG. 1 is a schematic diagram for explaining a state in which the communication system in the present embodiment transmits and receives a packet.

In the communication system in the present embodiment, an apparatus of a transmission side and an apparatus of a reception side are connected via a high-quality and high-speed network, so that a packet is transmitted and received between the apparatuses.

In the communication system of the present embodiment, the apparatus of the transmission side transmits a packet, so that the apparatus of the reception side transmits a received packet by return. The apparatus of the transmission side sequentially transmits a number of packets, which is determined by a setting, from the time when starting communication without performing connection establishment between the apparatuses of the transmission side and the reception side. The number of packets determined by the setting is, for example, a number of packets by which congestion does not occur, wherein the usable band is determined as an upper limit, and the number is adjusted beforehand with the communication partner.

When the apparatus of the transmission side receives a return packet that is transmitted by return, the apparatus of the transmission side compares the transmitted packet with the received return packet to confirm that the packet has been correctly transmitted. By the way, as a result of comparison of the packets, when they do not match, the apparatus of the transmission side retransmits the packet. Also, when the return packet is not received within a time-out period, the apparatus of the transmission side retransmits the packet.

Currently, 10 gigabit ethernet is widespread. In the case of full-duplex communication like the 10 gigabit ethernet, the network is not affected even though packets are transmitted from the transmission side to the reception side, and at the same time, return packets are transmitted from the reception side to the transmission side. By the way, since the apparatus of the transmission side transmits packets one after another without waiting for return of return packets from the apparatus of the reception side, use efficiency of the circuit improves.

Next, a configuration of the communication system in the present embodiment is described.

Figure 2:
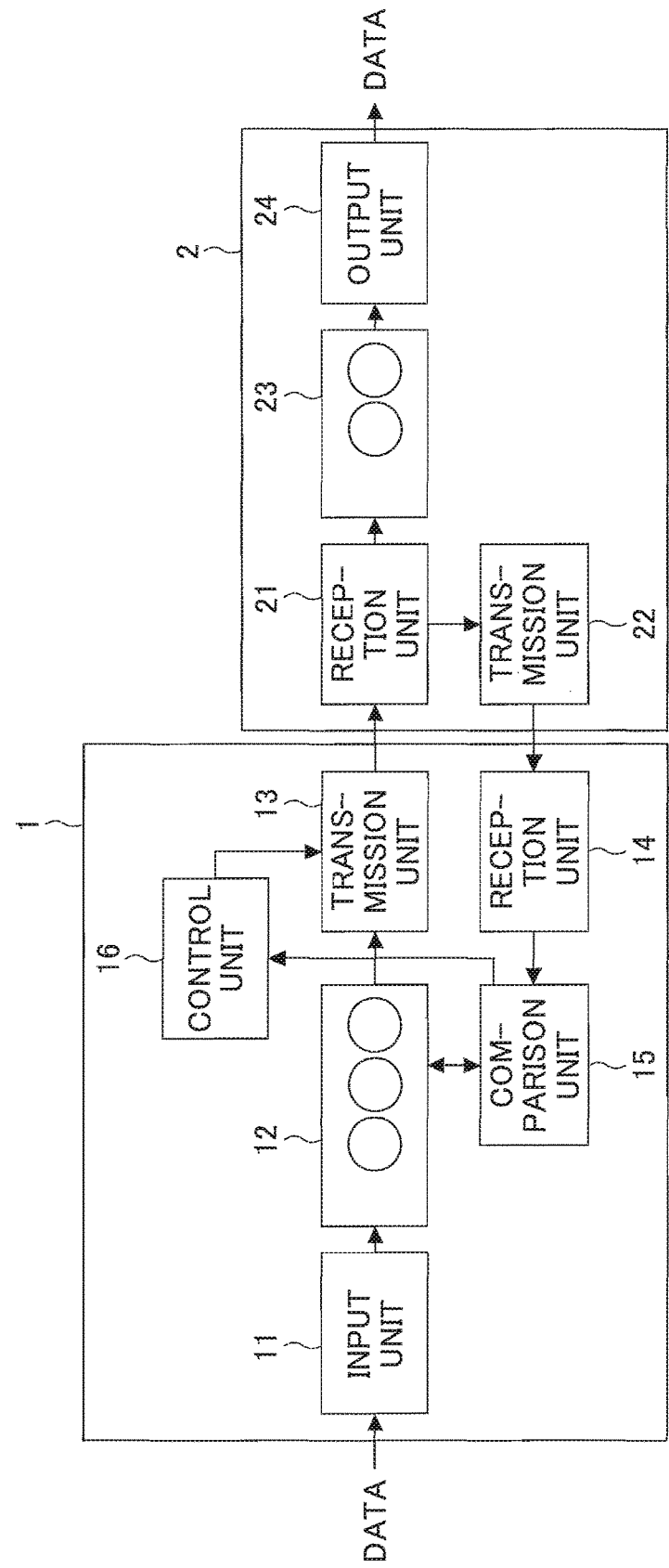
FIG. 2 is a functional block diagram showing a configuration of the communication system of the first embodiment.

FIG. 2 is a functional block diagram showing a configuration of the communication system of the present embodiment. As shown in FIG. 2, the communication system of the present embodiment includes a transmission apparatus 1 and a reception apparatus 2.

The transmission apparatus 1 includes an input unit 11, a transmission buffer 12, a transmission unit 13, a reception unit 14, a comparison unit 15, and a control unit 16.

The input unit 11 inputs data to be transmitted from an application and the like, and divides the data into packets to store them in the transmission buffer 12. The transmission buffer 12 is a memory area for temporarily holding packets. In FIG. 2, packets are indicated by circles.

The transmission unit 13 extracts a packet from the transmission buffer 12, and adds, to the packet, a header including a transmission source, a transmission destination, and control information used for retransmission and flow control, and transmits the packet to the reception apparatus 2. As information included in the header, there is a sequence number that indicates an order of the packet, for example. When the arriving order of packets is changed, the reception apparatus 2 permutes the packets using the sequence number.

The reception unit 14 receives a return packet that is transmitted by return from the reception apparatus 2, and transmits it to the comparison unit 15.

The comparison unit 15 compares the return packet with the transmitted packet stored in the transmission buffer 12. As a result of comparison, when they match, the packet that is compared is deleted from the transmission buffer 12. When they do not match, the comparison unit 15 instructs the control unit 16 to retransmit the packet that is compared. The transmitted packet corresponding to the return packet can be specified by using a sequence number described in the header of the packet, for example.

The control unit 16 performs communication control such as packet retransmission and flow control and the like.

The reception apparatus 2 includes a reception unit 21, a transmission unit 22, a reception buffer 23 and an output unit 24.

The reception unit 21 receives a packet from the transmission apparatus 1, stores the received packet in the reception buffer 23, and transmits the received packet to the transmission unit 22. The transmission unit 22 transmits the packet received from the reception unit 21 to the transmission unit 1 as a return packet. The reception buffer 23 is a memory area for temporarily holding a received packet.

The output unit 24 obtains packets from the reception buffer 23 to reconstruct data that the transmission apparatus 1 transmitted, and passes the data to an application and the like.

The respective units provided in the transmission apparatus 1 and the reception apparatus 2 may be realized by a computer having a calculation processing device and a memory device and the like, in which processing in each unit may be executed by a program. The program is stored in a memory device provided in the transmission apparatus 1 and the reception apparatus 2. The program can be recorded in a recording medium such as a magnetic disc, an optical disc, a semiconductor memory and the like, and also the program can be provided via a network.

Also, in FIG. 2, although the transmission apparatus 1 and the reception apparatus 2 are shown as apparatuses having only a transmission function and a reception function respectively, both of the transmission apparatus 1 and the reception apparatus 2 may have transmission and reception functions. Also, it is possible that the communication system of the present embodiment can be implemented on existing datagram communication such as IP and UDP, for example.

Next, operation of the communication system in the present embodiment is described.

Figure 3:
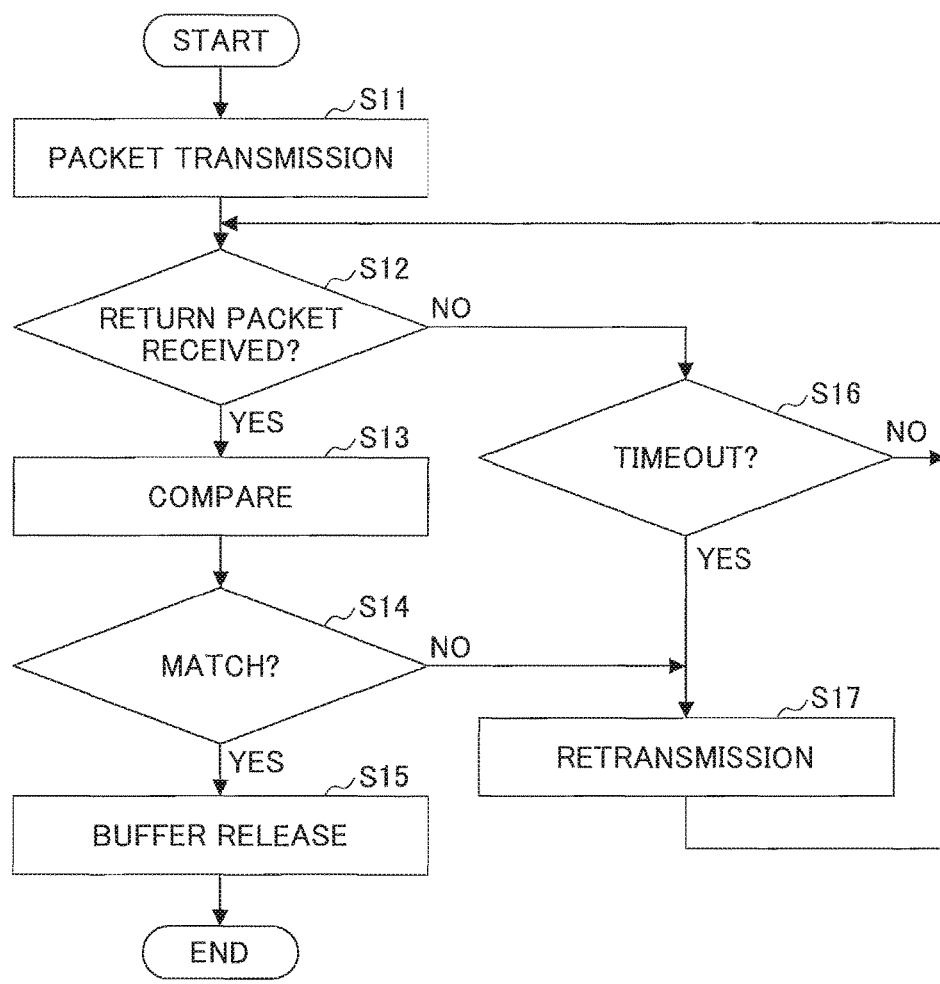
FIG. 3 is a flowchart showing a flow of processing in which a transmission apparatus 1 transmits a packet.

First, processing for the transmission apparatus 1 to transmit a packet is described. FIG. 3 is a flowchart showing a flow of processing by the transmission apparatus 1 to transmit a packet.

The transmission unit 13 takes a packet from the transmission buffer 12 and transmits the packet to the reception apparatus 2 (step S11). Next, the reception unit 14 determines whether a return packet is received from the reception apparatus 2 (step S12).

When the reception unit 14 receives the return packet (YES in step S12), the reception unit 14 transmits the received return packet to the comparison unit 15 so that the comparison unit 15 compares the return packet with the transmitted packet held in the transmission buffer 12 (step S13).

As a result of comparison by the comparison unit 15, when the return packet and the transmitted packet match (YES in step S14), the transmitted packet is deleted from the transmission buffer 12 (step S15).

On the other hand, when the return packet is not received (NO in step S12), the transmission apparatus 1 determines whether a predetermined very short timer has timed out (step S16). The communication system in the present embodiment transmits and receives packets using a high speed network, and the reception apparatus 2 immediately sends back a received packet as it is by return. Thus, it is not necessary to set a long timer. Therefore, in the present embodiment, the very short timer is set in consideration of communication quality of the network between the transmission apparatus 1 and the reception apparatus 2.

When the timer has not timed out (NO in step S16), the process returns to step S12, and the transmission apparatus 1 waits for arrival of a return packet.

When the timer times out (YES in step S16), the transmission apparatus 1 obtains a packet from the transmission buffer 12 again to retransmit the packet (step S17). When time-out occurs, only one-time retry or so is performed. When time-out occurs in the retry, the transmission apparatus 1 waits by performing backoff. As processing of the backoff, processing similar to CSMA/CD can be performed. When time-out further occurs, the state of the reception apparatus 2 is checked by using another communication method (TOP, for example).

Also, when the return packet and the transmitted packet do not match as a result of comparison by the comparison unit 15 (NO in step S14), the transmission apparatus 1 performs retransmission processing of the packet (step S17). Retransmission of a packet is performed one-by-one.

Figure 4:
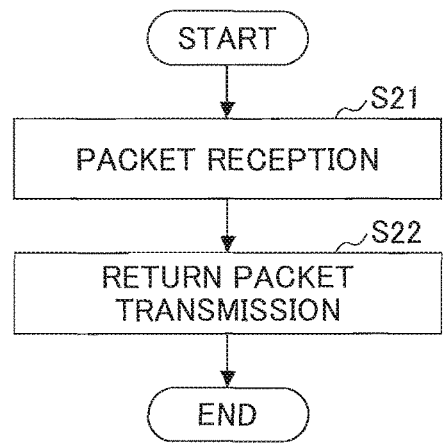
FIG. 4 is a flowchart showing a flow of processing in which a reception apparatus receives a packet.

Next, processing in which the reception apparatus 2 receives a packet is described. FIG. 4 is a flowchart showing a flow of processing in which the reception apparatus 2 receives a packet.

When the reception unit 21 receives a packet, the reception unit 21 stores the packet in the reception buffer 23, and passes the received packet to the transmission unit 22 (step S21).

The transmission unit 22 transmits the packet received from the reception unit 21 to the transmission apparatus 1 that is a transmission source of the packet (step S22).

Comparison Example

Next, the communication scheme of the communication system in the present embodiment is compared with TCP.

Figure 5:
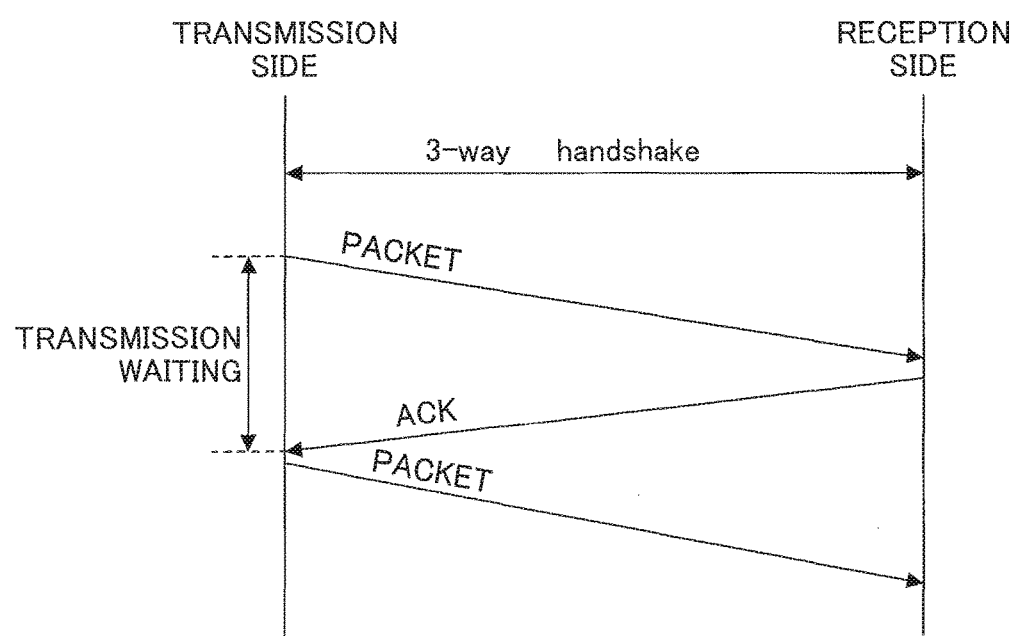
FIG. 5 is a schematic diagram for explaining a situation where packets are transmitted and received by using TCP.

FIG. 5 is a schematic diagram for explaining a situation in which a packet is transmitted and received using TCP that is a comparison example.

In TCP, first, a connection is established between the transmission side and the reception side by 3-way handshake. After the 3-way handshake, the transmission side transmits a packet. The reception side receives the packet, and sends back an ACK to the transmission side. The transmission side transmits a next packet after receiving the ACK. Therefore, as shown in FIG. 5, transmission waiting time occurs from when the transmission side transmits a packet until the transmission side receives an ACK.

Figure 6:
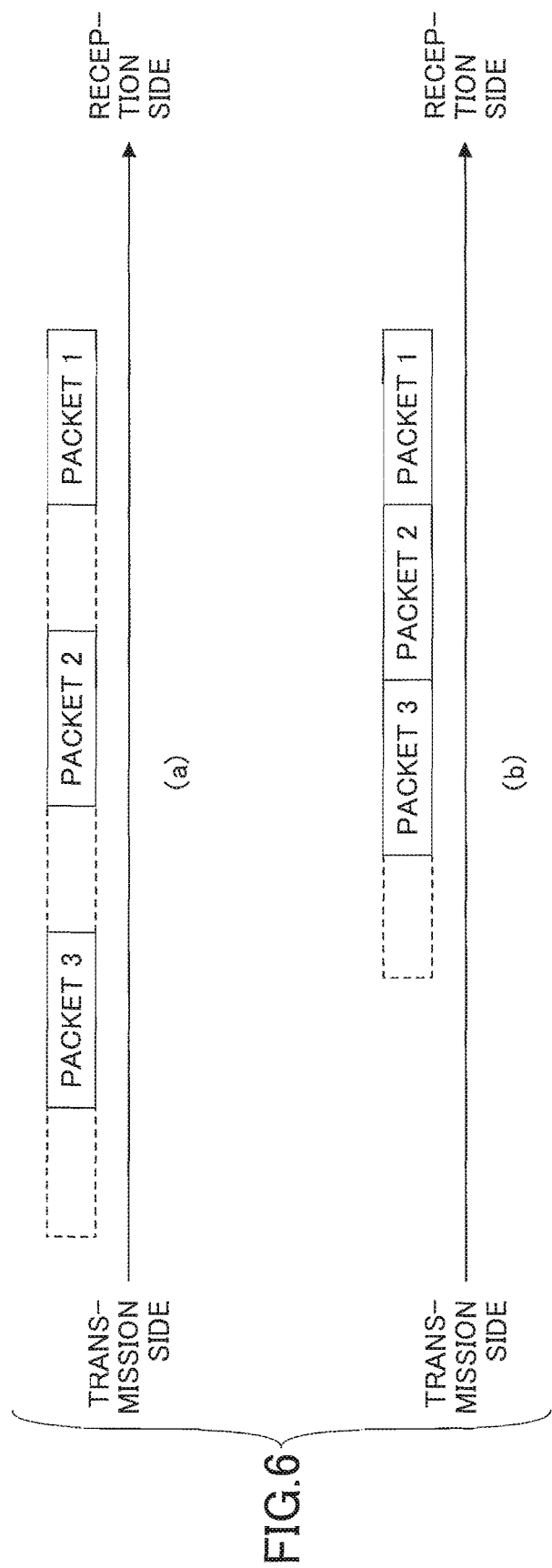
FIG. 6 is a schematic diagram for showing a situation of packets that flow in a route from a transmission side to a reception side.

FIG. 6 is a schematic diagram showing a situation of Packets that flow in a route from the transmission side to the reception side. FIG. 6(*a*) is a diagram showing a situation of packets that flow in a route when using TCP, and FIG. 6(*b*) is a diagram showing a situation of packets that flow in a route when using the communication system of the present embodiment.

In the example using TCP shown in FIG. 6(*a*), after the transmission side transmits a packet 1, the transmission side does not transmit a packet 2 until receiving an ACK transmitted by the reception side. Thus, transmission waiting time exists after transmission of the packet 1 before the packet 2 is transmitted.

In the example using the communication system in the present embodiment shown in FIG. 6(*b*), after the transmission side transmits a packet 1, the transmission side transmits a following packet 2 without waiting for a return packet of the packet 1. Thus, transmission waiting time does not exist after transmission of the packet 1 before the packet 2 is transmitted. Comparing between FIGS. 6(a) and 6(b), total time from when the transmission side transmits the packet 1 until the transmission side confirms that a packet 3 is received (in the case of FIG. 6(a), until receiving an ACK, in the case of FIG. 6(b), until receiving a return packet of the packet 3) is shorter in the communication system of the present embodiment.

By the way, in TCP, a scheme called window control is adopted, in which efficiency is obtained by transmitting a plurality of packets of the window size without confirming an ACK. The reception side transmits one ACK for the plurality of packets. After receiving an ACK, the transmission side transmits following packets of one window size. Even in the window control, after transmitting packets of one window size, transmission waiting time occurs until confirming the ACK.

Also, in TCP, a scheme called sliding window is adopted, in which, when there is a space in the window of the reception side, packets are transmitted without waiting an ACK. Since the space of the window of the reception side is reported by the ACK, even by the sliding window, transmission waiting time occurs until an ACK is confirmed.

Next, as to reliability, comparison with existing communication protocol is described.

Although there is UDP as a protocol for transferring data at high speed, UDP does not ensure reliability/ordering/data integrity. On the other hand, in the present embodiment, since the transmission apparatus 1 compares a transmitted packet with a return packet returned from the reception apparatus 2, reliability and data integrity are ensured. As to ordering, it can be supported by including information, in a header and the like, indicating an order of the packet to be transmitted.

Also, the checksum of TCP is a value of 16 bits using one's complement. On the other hand, in the communication system of the present embodiment, since the packet transmitted by the transmission apparatus 1 is compared with the packet received by the reception apparatus 2 as it is, very high reliability (integrity) can be obtained by the communication system of the present embodiment, compared with TOP. Also, in the communication system of the present embodiment, since only comparison between packets is performed to determine whether they match, the load of the processing is not high.

Further, as to TOP, due to the sequence number of ACK or time-out, waste may occur in which the transmission side retransmits a packet that has been normally received in the reception side. On the other hand, the communication system of the present embodiment only retransmits a packet by which the comparison result indicates unmatch and a timed-out packet. Thus, waste of packet retransmission can be inhibited.

Application Example

Next, an application example of the present embodiment is described.

As a first application example, an example in which the communication system is applied to secret sharing is explained. A secret sharing technique is known for enhancing security by, for example, generating three shares Sa, Sb, Sc from original data S and storing each share Sa, Sb, Sc separately. Further, there is a technique in which, when a share Sa in the shares Sa, Sb, Sc disappears, the disappeared share Sa can be regenerated using the remaining shares Sb and Sc without restoring the original data S.

For example, three shares Sa, Sb, Sc are stored in separate regional data centers DCa, DCb, DCc respectively. At this time, when one regional data center DCa collapses due to earthquake and the like, it is necessary to regenerate the disappeared share Sa in a new regional data center DCx. In this case, it is necessary to transfer the shares Sb, Sc, to the new regional data center DCx, from the regional data centers DCb, DCc respectively, which causes a situation where burst communication occurs. By utilizing the communication system of the present embodiment for the communication of transferring the shares Sb and Sc to the new regional data center DOx, the disappeared share Sa can be regenerated as quickly as possible. It is also possible to transfer the shares Sb and Sc by using TOP. However, by using the communication system of high circuit utilization, it is not necessary to increase the speed of the physical circuit and to increase the number of circuits.

As a second application example, an example is described in which the communication system is applied to file transfer between geographically separated sites (between Japan and U.S.A., for example). In recent years, there are many cases where development sites are placed in various locations in the world. Also, the amount of data to handle is becoming enormous. By utilizing the communication system of the present embodiment for transferring the enormous amount of data between geographically separated sites, it becomes possible to transfer data at high speed with more reliability. Also, it is possible to realize cost reduction by using the communication system of the present embodiment without connecting between sites by a dedicated line. For example, the effect is high by using a network, that is adequately managed, in which available bands are ensured. However, it is not limited to this.

As described above, according to the present embodiment, the reception apparatus 2 sends back a packet transmitted by the transmission apparatus 1 to the transmission apparatus 1 as a return packet, and the transmission apparatus 1 compares the packet transmitted by the transmission apparatus 1 with the return packet, so that it can be ensured that a transmitted packet has arrived at the reception apparatus 2 without fail. Also, the transmission apparatus 1 continues to transmit packets without waiting a response from the reception apparatus 2, so that improvement of circuit utilization can be realized.

According to the present embodiment, instead of slow-starting at the beginning of connection establishment like TCP, the transmission apparatus 1 transmits a number of packets predetermined by setting from the start of communication. Therefore, improvement of circuit utilization can be realized.

According to the present embodiment, when the result of comparison with the return packet is unmatch or when time-out occurs, only a concerned packet is retransmitted. Thus, waste of retransmitting a packet that the reception apparatus 2 has received does not occur.

According to the present embodiment, by utilizing existing datagram communication such as IP or UDP, it becomes possible to use commoditized hardware, so that significant improvement of cost-performance can be expected.

Summary of the First Embodiment

According to the first embodiment, there is provided a communication system including a transmission apparatus and a reception apparatus, the transmission apparatus including: a buffer configured to hold a first packet to transmit; transmission means configured to transmit the first packet to the reception apparatus; reception means configured to receive a second packet that the reception apparatus returns; comparison means configured to compare the second packet with the first packet held by the buffer; and control means configured, when a result of the comparison by the comparison means is unmatch, to instruct the transmission means to retransmit the first packet.

In the communication system, the transmission apparatus may transmit next first packet without waiting return of the second packet.

In the communication system, the number of the first packets to transmit without waiting the return of the second packet is determined by setting, for example.

In the communication system, the control means deletes the first packet from the buffer when a result of the comparison by the comparison means is match.

In the communication system, the control means may instruct the transmission means to retransmit the first packet when time-out occurs without receiving the second packet within a predetermined period.

In the communication system, after retransmitting a first packet due to time-out, the communication system waits by Performing backoff when time-out also occurs for the first packet, and when further time-out occurs, the communication system may check a state of the reception apparatus by another communication method.

In the communication system, the first packet and the second packet are transferred by using datagram communication, for example.

Also, according to the present embodiment, there is Provided a transmission apparatus including: a buffer configured to hold a first packet to transmit; transmission means configured to transmit the first packet to a reception apparatus; reception means configured to receive a second packet that the reception apparatus returns; comparison means configured to compare the second packet with the first packet held by the buffer; and control means configured, when a result of the comparison by the comparison means is unmatch, to instruct the transmission means to retransmit the first packet.

Also, according to the present embodiment, there is provided a reception apparatus including: reception means configured to receive a first packet from a transmission apparatus; and transmission means configured to return the received first packet to the transmission apparatus as a second Packet.

Also, according to the present embodiment, there is provided a communication method performed by a transmission apparatus and a reception apparatus, including: a step of transmitting a first packet to the reception apparatus; a step of receiving a second packet that the reception apparatus returns; a step of comparing the second packet with the first packet; and a step of, when a result of the step of comparing is unmatch, retransmitting the first packet, which are performed by the transmission apparatus.

Second Embodiment

In the following, a second embodiment of the present invention is described with reference to figures. In the present embodiment, as described below, exclusive OR is used as a method for superimposing two pieces of data. However, the method for superimposing two pieces of data is not limited to the exclusive OR. Also, "data" has a meaning including "packet", "frame", and "cell" and the like.

System Configuration

Figure 7:
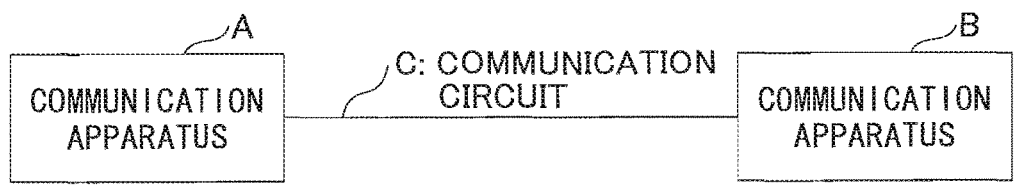
FIG. 7 is a block diagram of a communication system in a second embodiment.

FIG. 7 shows a block diagram of a communication system of the present embodiment. As shown in FIG. 7, the communication system of the present embodiment has a configuration in which a communication apparatus A and a communication apparatus B are connected by a communication circuit C.

Each of the communication apparatuses A and B is an apparatus including a function for transmitting and receiving data via the communication circuit C, and, for example, is a server related to a service such as a storage service. However, the communication apparatus A, B is not limited to a specific type of apparatus such as a server. For example, any one of or both of the communication apparatuses A and B may be (a) user terminal(s), and, one of or both of the communication apparatuses A and B may be (a) router(s), (a) switch(s) and the like for relaying data.

The communication circuit C is a bidirectional communication circuit that can simultaneously perform communication from the communication apparatus A to the communication apparatus B and communication from the communication apparatus B to the communication apparatus A. The communication circuit C may be any circuit as long as the circuit has a communication band from the communication apparatus A to the communication apparatus B and a communication band from the communication apparatus B to the communication apparatus A. For example, the communication circuit C may be a circuit identified as one circuit, or may be two circuits including one circuit per direction. Also, the circuit may be referred to as a transmission route, a path, a communication route and the like. Also, the communication circuit C may be a physical circuit such as an optical fiber, an electric cable and the like, or may be a logical circuit (example: VPN) formed in a network, such as the Internet, including many apparatuses, or may be one in which these are combined.

Operation Outline of the System

Next, outline of operation of the communication system of the present embodiment is described with reference to FIG. 8. In FIGS. 8(a) and (b), although communication starts from the communication apparatus A, this is for the sake of convenience of explanation.

In order to solve the problem that reliability is not enough as for the communication protocol such as TCP/IP, in the first embodiment, the reception side transmits data received from the transmission side to the transmission side as it is (return), and the transmission side verifies whether the data (return data) matches the transmitted data, so that the transmission side checks whether the transmitted data has arrived at the reception side without fail.

Figure 8:
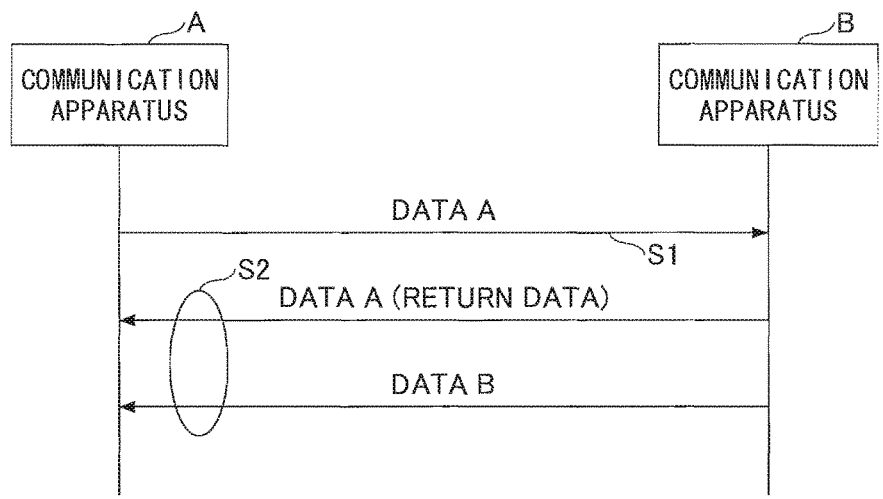
FIG. 8 is a diagram for explaining basic operation of the communication system in the second embodiment.
Figure 8:
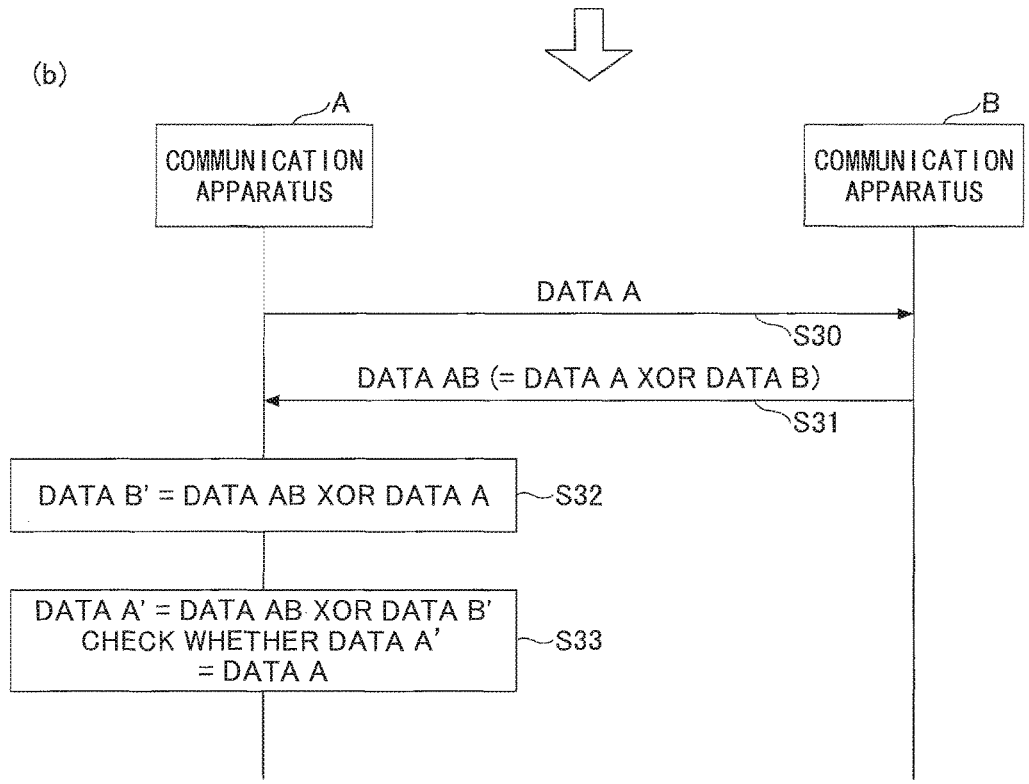

FIG. 8 (a) shows a procedure example of such a communication. As shown in FIG. 8 (a), first, the communication apparatus A transmits data A to the communication apparatus B (step S1).

In order that the communication apparatus A confirms that the data A has arrived at the communication apparatus B without fail, the communication apparatus B transmits the data A (it is assumed that the data A is received by the communication apparatus B without an error) received from the communication apparatus A to the communication apparatus A (step S2).

At the timing of retuning the data A, there is data B, in the communication apparatus B, to be transmitted to the communication apparatus A, so that the communication apparatus B also transmits the data B to the communication apparatus A (step S2). In a case where such a communication is performed, the data A and the data B are transmitted from the communication apparatus B to the communication apparatus A. So, when there is not enough band for transmitting the data A (return data) and the data B, it takes time to transmit data A+ data B, and delay occurs.

FIG. 8(b) shows outline of communication in the present embodiment. First, similarly to the above-mentioned way, the communication apparatus A transmits data A to the communication apparatus B (step S30). The communication apparatus B that receives the data A returns the data A to the communication apparatus A, and also transmits the data B to the communication apparatus A. However, in this example, instead of transmitting these pieces of data as they are, the communication apparatus B transmits data (described as data AB) obtained by calculating exclusive OR (XOR) between the data A and the data B (step S31). For example, when the data size of each of the data A and the data B is 10, the data size after exclusive OR (XOR) operation is also 10. In the present embodiment, it is possible to transmit the data A and the data B without increasing the data amount compared with the case where only data B (or data B) is transmitted.

The communication apparatus A that receives data AB calculates exclusive OR between the data A, that is transmitted in step S30 and is held, and the received data AB to obtain data B' which is the result (step S32). In a case where both of data AB and data A have been transmitted and received without an error, the exclusive OR of data AB and data A is data B. Thus, the result of step S33 is described as data B.

The communication apparatus A calculates exclusive OR between data B' that is a result in step S32 and the received data AB to obtain data A' which is the result. In a case where both of data AB and data A have been transmitted and received without an error, the exclusive OR of data AB and data B' (data B) is data A. Thus, the result of step S33 is described as data A'.

Further in step S33, the held data A is compared with the calculated data A' to check whether they match. When they match, the communication apparatus A estimates that both of data AB and data A have been transmitted and received without an error, so that the communication apparatus A can use data B' as data B (data B transmitted by the communication apparatus B). Also, since data A'=data A holds true, it can be determined (estimated) that the communication apparatus B has received data A correctly. By the way, this is an example, and as described later, check of a larger number of stages may be performed.

Detailed Example of Operation

Next, the operation example of the communication system in the present embodiment is described in more detail. In the following, as an example of data to be transmitted and received, "packet" is used. Also, a packet transmitted from the communication apparatus A to the communication apparatus B is indicated by a symbol of A, a packet transmitted from the communication apparatus B to the communication apparatus A is indicated by a symbol of B, and a packet transmitted by performing exclusive OR operation is indicated by a symbol of Pkt. Also, in the specification, as a symbol for indicating exclusive OR operation, * is used. Further, as an identifier indicating order of a packet, i (i is a natural number) is used, and as to data for which it is not clear whether the data is correct or not due to the possibility of communication error and the like, ' (dash) is attached.

In this example, for example, session management is performed in a session layer, and communication starts from the communication apparatus A.

The communication apparatus A makes an exclusive OR between a packet $A_i$ for transmission and a packet $B_{(i-1)}$ that is received most recently from the communication apparatus B as a packet $Pkt_i$ to be transmitted to the communication apparatus B. By the way, when starting the session, that is, when there is not a packet $B_{(i-1)}$ in the communication apparatus A, it is assumed that $B_{(i-1)}=0$.

On the other hand, after receiving a packet $Pkt_i'$, the communication apparatus B performs exclusive OR operation between the packet $Pkt_i'$ and the packet $B_{(i-1)}$ to obtain $Pkt_i'*B_{(i-1)}=A_i'$. At this time point, based on an assumption that a communication error does not occur, $A_i'=A_i$ holds true. However, at this time point, it is not known whether the assumption is correct or not. By the way, in this example, it is assumed that i is 1, thus, $B_{(i-1)}=B_0=0$ holds true. That is, it is assumed that, at the start of the session, as a matter of arrangement between the communication apparatus A and the communication apparatus B, data of a value of 0 has already been transmitted from the communication apparatus B to the communication apparatus A without an error.

After the communication apparatus B derives $A_i'$, the communication apparatus B calculates exclusive OR between this and $Pkt_i'$ to obtain $B_{(i-1)}'=Pkt_i'*A_i'$. Here, since it is not clear whether the assumption is correct or not, the result of the calculation is described as $B_{(i-1)}'$ instead of $B_{(i-1)}$. However, here, $B_{(i-1)}=0$ holds true, which is determined irrespective of communication, and is correct irrespective of communication errors. Therefore, when $B_{(i-1)}'$ and $B_{(i-1)}$ are the same by comparing them, $B_{(i-1)}'\rightarrow B_{(i-1)}$ (which means that $B_{(i-1)}'$ is $B_{(i-1)}$) is deterministically verified.

Therefore, when $B_{(i-1)}'$ that is derived by the above-mentioned method from $Pkt_i'$ is correct, $A_1'\rightarrow A_{(i)}$ is assumed (is estimated). In order to determine it, the communication apparatus B performs returning operation for transmitting, to the communication apparatus A, the packet $A_i'$ that is assumed to be the packet $A_i$. That is, the communication apparatus B transmits, to the communication apparatus A, $Pkt_{(i+1)}=A_i'*B_i$ that is an exclusive OR between data $B_i$ to be transmitted from the communication apparatus B and $A_i'$.

The communication apparatus A that receives $Pkt_{(i+1)}=A_i'*B_i$ calculates $B_i'=Pkt_{(i+1)}'*A_i$ and $A_i'=Pkt_{(i+1)}'*B_i'$, and performs arrival checking of $A_i$ at the communication apparatus B by confirming that the calculated $A_i'$ and the holding $A_i$ match, and the communication apparatus A performs returning operation to the communication apparatus B by assuming $B_i'\rightarrow B_i$. Here, if the calculated $A_i'$ is not the same as the holding $A_i$, since it can be estimated that $A_i$ did not arrive at the communication apparatus B correctly, recovery by retransmission is performed. That is, retransmission of $Pkt_i$ is performed.

Figure 9:
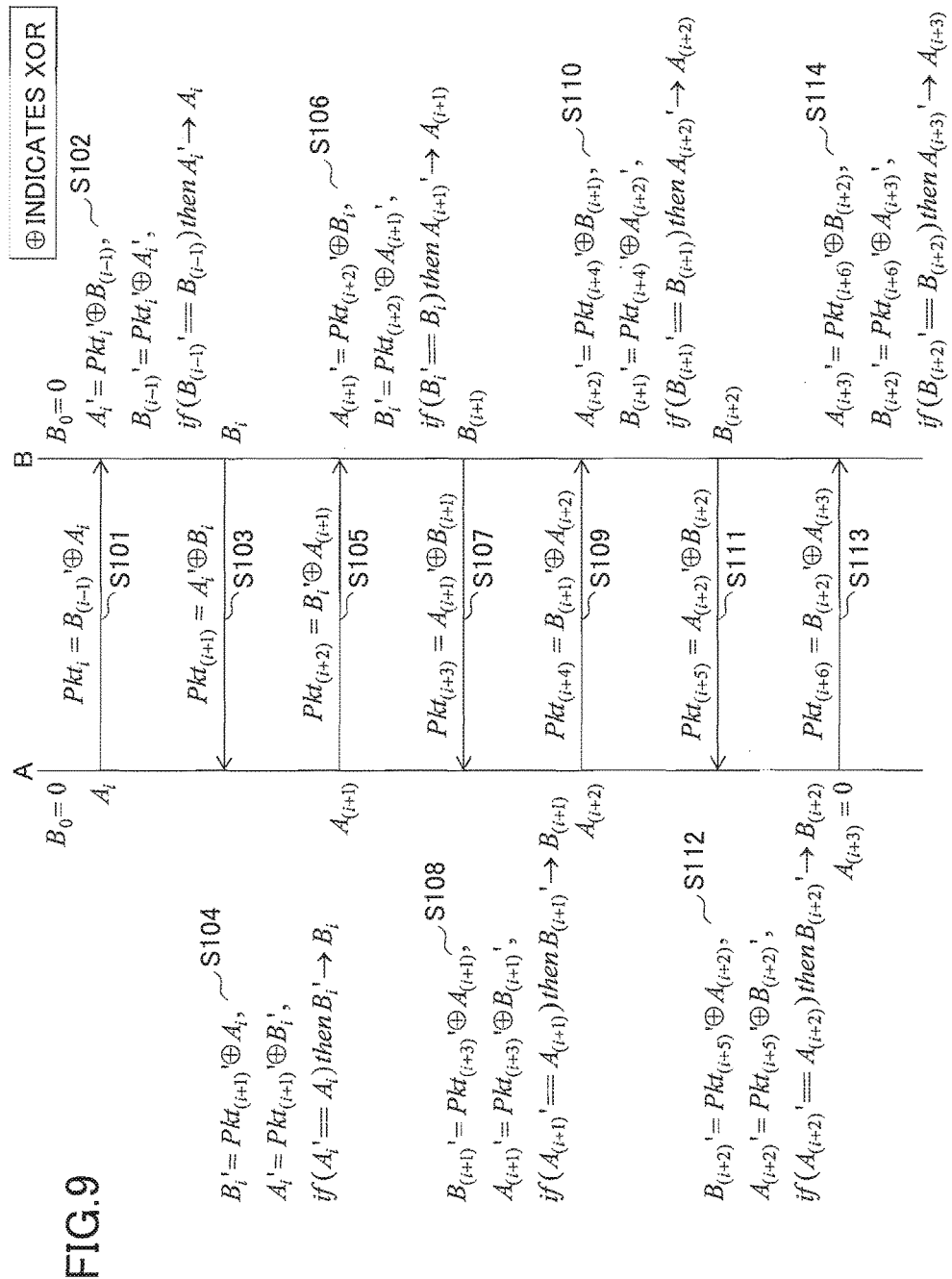
FIG. 9 is a sequence diagram for explaining operation of the communication system in the second embodiment in detail.

Next, with reference to FIG. 9, an operation sequence example between the communication apparatus A and the communication apparatus B including the above content is described. In this example, simultaneous bidirectional communication is performed between the communication apparatus A and the communication apparatus B. Also, a session starts from the communication apparatus A, and the communication apparatus A ends the session. Also, both of the communication apparatuses A and B communicate data (packet) of the same length. When the data length to transmit is different between these apparatuses, data length may be aligned by 0 padding and the like.

Also, it is assumed that a packet B that is superimposed on a packet A by exclusive OR operation is 0 when the communication apparatus A starts communication. The fact that this is 0 is known beforehand by the communication apparatus A and the communication apparatus B. In the following description, from the standpoint of simplifying description, a packet is indicated by only a symbol as necessary, in which packet $Pkt_i$ is described as $Pkt_i$, for example. Also, "X=Y" in FIG. 9 and in the specification means performing comparison between X and Y to check whether they match.

FIG. 9 is a diagram showing a situation from when the communication apparatus A transmits a packet $A_i$ after a plurality of times of packet transmission and reception have already been performed from the start of communication.

The communication apparatus A transmits $Pkt_i = B_{(i-1)}'^*A_i$ to the communication apparatus B (step S101). $B_{(i-1)}'$ is a packet estimated to be $B_{(i-1)}$ at the communication apparatus A, and is return data to the communication apparatus B.

$Pkt_i$ that is transmitted from the communication apparatus A arrives at the communication apparatus B as $Pkt_i'$ which is a packet in which there is a possibility that a communication error occurs. The communication apparatus B that receives $Pkt_i'$ performs an operation of $A_i' = Pkt_i'^*B_{(i-1)}$ and $B_{(i-1)}' = Pkt_i'^*A_i'$ in step S102 to obtain $A_i'$ and $B_{(i-1)}'$. Here, in the operation of $A_i' = Pkt_i'^*B_{(i-1)}$ it is assumed that $B_{(i-1)}'$ included in $Pkt_i'$ is Non-Error (which means there is no error).

The communication apparatus B compares $B_{(i-1)}'$ with $B_{(i-1)}$ that is held by the communication apparatus B to verify that $B_{(i-1)}'$ is Non-Error. When they match, it can be estimated that $B_{(i-1)}$ transmitted to the communication apparatus A by an (i−1)th packet has arrived at the communication apparatus A correctly, so that transmittal confirmation can be performed. Also, when $B_{(i-1)}'$ and $B_{(i-1)}$ match, $A_i'$ is estimated as $A_i$ ($A_i' \rightarrow A_i$). At this time point, the integrity of $A_i'$ is unclear at the communication apparatus B. However, as concrete processing, at this time point, $A_i'$ may be regarded as $A_i$ so that processing of treating $A_i'$ as $A_i$ may be performed. By the way, when $B_{(i-1)}'$ and $B_{(i-1)}$ match, and $B_i'$ and $B_i$ match continuously, $A_i'$ may be regarded as $A_i$ so that processing using $A_i$ may be performed here.

When $B_{(i-1)}'$ and $B_{(i-1)}$ do not match, for example, the communication apparatus B retransmits Pkt including $B_{(i-1)}$ to the communication apparatus A.

Next, the communication apparatus B transmits $Pkt_{(i+1)} = A_i'^*B_i$ to the communication apparatus A (step S103). $A_i'$ is return data for $A_i$.

$Pkt_{(i+1)}$ transmitted from the communication apparatus B arrives at the communication apparatus A as $Pkt_{(i+1)}'$ which is a packet in which there is a possibility that a communication error occurs. The communication apparatus A that receives $Pkt_{(i+1)}'$ performs an operation of $B_i' = Pkt_{(i+1)}'^*A_i$ and $A_i' = Pkt_{(i+1)}'^*B_i'$ in step S104 to obtain $B_i'$ and $A_i'$. Also, the communication apparatus A compares $A_i'$ with $A_i$ that is held by the communication apparatus A. When they match, it can be estimated that $A_i$ transmitted to the communication apparatus B by the i-th packet has arrived at the communication apparatus B correctly, so that transmittal confirmation can be performed. Also, when $A_i'$ and $A_i$ match, $B_i'$ is estimated as $B_i$ ($B_i' \rightarrow B_i$). At this time point, the integrity of $B_i'$ is unclear at the communication apparatus A. However, as concrete processing, at this time point, $B_i'$ may be regarded as $B_i$ so that processing of treating $B_i'$ as $B_i$ may be performed.

When $A_i'$ and $A_i$ do not match, for example, the communication apparatus A retransmits $Pkt_i$ to the communication apparatus B. That is, the process returns to step S101.

Next, the communication apparatus A transmits $Pkt_{(i+2)} = B_i'^*A_{(i+1)}$ to the communication apparatus B (step S105).

$Pkt_{(i+2)}$ transmitted from the communication apparatus A arrives at the communication apparatus B as $Pkt_{(i+2)}'$ which is a packet in which there is a possibility that a communication error occurs. The communication apparatus B that receives $Pkt_{(i+2)}'$ performs an operation of $A_{(i+1)}' = Pkt_{(i+2)}'^*B_i$ and $B_i' = Pkt_{(i+2)}'^*A_{(i+1)}'$ in step S106 to obtain $A_{(i+1)}'$ and $B_i'$. Also, the communication apparatus B compares $B_i'$ with $B_i$ that is held by the communication apparatus B. When they match, it can be estimated that $B_i$ transmitted to the communication apparatus A by an (i+1)th packet has arrived at the communication apparatus A correctly, so that transmittal confirmation can be performed. Also, when $B_i'$ and $B_i$ match, $A_{(i+1)}'$ is estimated as $A_{(i+1)}$ ($A_{(i+1)}' \rightarrow A_{(i+1)}$). At this time point, the integrity of $A_{(i+1)}'$ is unclear at the communication apparatus B. However, as concrete processing, at this time point, $A_{(i+1)}'$ may be regarded as $A_{(i+1)}$ so that processing of treating $A_{(i+1)}'$ as $A_{(i+1)}$ may be performed.

When $B_i'$ and $B_i$ do not match, for example, the communication apparatus B retransmits $Pkt_{(i+1)}$ to the communication apparatus A. That is, the process returns to step S103. Here, in the processing of step S104 after returning to step S103, if $A_i'$ and $A_i$ do not match, the process returns to step S101.

From the time point of start of step S101, at the time point when agreement between $B_i'$ and $B_i$ is confirmed in step S106, transfer of $A_i$ and $B_i$ has completed by the simultaneous bidirectional communication between the communication apparatus A and the communication apparatus B. Here, $B_i$ at the communication apparatus A and $A_i$ at the communication apparatus B may be determined respectively.

As shown in FIG. 9, also after step S107, transmission and reception of packets are performed by similar operation.

In the example of FIG. 9, the communication apparatus A transmits data ($A_{(i+3)}$ in the example of FIG. 9) of a value of 0 in step S113 in order to end the session. This is similar to the case where received data ($B_0$) arrived right before is assumed to be 0 at the communication apparatus A when starting the session. In other words, an assumption is provided that final data arrives at the other party without fail. That is, it is arranged beforehand between the transmission and the reception sides. When the communication apparatus B knows that final data from the communication apparatus A is 0, it is enough that the commutation apparatus B confirms agreement between previous transmission data of the communication apparatus B and a return packet of it from the communication apparatus A, and confirms whether a value that is derived from the final packet from the communication apparatus A and that can be thought as final data from the communication apparatus A is 0 or not.

As to ordering of packets, for $Pkt_i$ received from the other side apparatus, assurance is necessary for $Pkt_{(i-1)}$ transmitted to the other side apparatus right before and for $Pkt_{(i+1)}$ transmitted to the other side apparatus right after. As to ordering, for example, it can be identified by a number and the like provided to a packet.

Tarallelism in Implementation Example

It is assumed that, as an implementation example, an IA-Server and the like is utilized (NFV and the like) as the communication apparatus A, B in the present embodiment. As an OS, it is assumed that Linux (registered trademark) and the like is used. As communication software, a full duplex virtual circuit abstracted by BSD socket is used. When applying UDP, port numbers can be utilized, and a method is effective in which parallelism is ensured in units of ports. More specifically, one port is processed by one thread, and multi-threads are executed by multi-ports, so that parallelism is ensured. Also, multi-core can be supported by the multi-threads.

As to the above-mentioned ordering, it is ensured in only one thread, and ensuring of ordering does not hinder improvement of parallelism. In the BSD Socket, 16 bits are assigned for ports of destination and source respectively. Also, since it is paired with IP address, there occurs no problem on restriction of identifiers.

The above-mentioned implementation example is merely an example. The technique of the present invention can be implemented by various schemes different from the above-mentioned implementation example.

Verification Example

In the following, some verification examples are shown on determination of if statement in the algorithm of communication described with reference to FIG. 9.

Verification Example 1

When it is assumed that the process of step S101 of FIG. 9 starts from i=1 and it is assumed that $B_0=000$ and $A_1=100$ hold true, $Pkt_1=100$ holds true. Here, it is assumed that a communication error occurs at a head bit of $Pkt_1=100$ and the communication apparatus B receives $Pkt_1'=000$. In this case, the communication apparatus B calculates $A_1'=Pkt_1'*B_0=000*000=000$ and $B_0'=Pkt_1'*A_1=000*000=000$. That is, although a communication error occurs, since $B_0'=B_0$ is obtained, erroneous estimation that $A_1'$ is is performed. However, since the communication apparatus B transmits return data to the communication apparatus A, the return data effectively functions, so that an error is detected at the communication apparatus A.

Verification Example 2

In the communication apparatus B that receives $Pkt_i'$ in step S101 of FIG. 9, if A is Error and B is Non-Error, since $Pkt_i'=B_{(i-1)}^{Non-Error}*A_i^{Error}$ holds true, $A_i'=Pkt_i'*B_{(i-1)}=(B_{(i-1)}^{Non-Error}*A_i^{Error})*B_{(i-1)}=A_i^{Error-1}(=A_i^{Error})$ and $B_{(i-1)}'=Pkt_i'*A_i'=(B_{(i-1)}^{Non-Error}*A_i^{Error})*A_i^{Error-1}=(B_{(i-1)}^{Non-Error}*A_i^{Error})*(B_{(i-1)}^{Non-Error}*A_i^{Error})*B_{(i-1)}=B_{(i-1)}$ are obtained.

Since $B_{(i-1)}'=B_{(i-1)}$ of the if statement holds true, $A_i'(=A_i^{Error-1}(=A_i^{Error}))$ is used as return data. However, since if ($A_i'=A_i$) in the communication apparatus A does not hold true, retransmission of $Pkt_i$ is performed. In this case, $B_{(i-1)}$ is Non-Error, so retransmission is an waste in this point. However, since both packets are superimposed, substantial waste does not occur.

Verification Example 3

In the communication apparatus B that receives $Pkt_i'$ in step S101 of FIG. 9, if A is Non-Error and B is Error, since $Pkt_i'=B_{(i-1)}^{Error}*A_i^{Non-Error}$ holds true, $A_i'=Pkt_i'*B_{(i-1)}=B_{(i-1)}^{Error}*A_i^{Non-Error})*B_{(i-1)}=A_i^{Error-2}$ and $B_{(i-1)}'=Pkt_i'*A_i'=(B_{(i-1)}^{Error}*A_i^{Non-Error})*A_i^{Error-2}=(B_{(i-1)}^{Error}*A_i^{Non-Error})*(B_{(i-1)}^{Error}*A_i^{Non-Error})*B_{(i-1)}=B_{(i-1)}$ are obtained.

That is, since $B_{(i-1)}'=B_{(i-1)}^{Error}$, $B_{(i-1)}'$ and $B_{(i-1)}$ do not actually match. However, since $B_{(i-1)}'=B_{(i-1)}$ of the if statement holds true, $A_i'(=A_i^{Error-2})*B_i$ is transmitted to the communication apparatus A, so that retransmission of $Pkt_i$ (including $B_{(i-1)}$) is performed from the communication apparatus. In this case, $A_i$ is Non-Error, so retransmission is an waste in this point. However, since both packets are superimposed, substantial waste does not occur.

Verification Example 4

In the communication apparatus B that receives $Pkt_i'$ in step S101 of FIG. 9, if A is Error and B is Error, since $Pkt_i'=B_{(i-1)}^{Error}*A_i^{Error}$ holds true, $A_i'=Pkt_i'*B_{(i-1)}=B_{(i-1)}^{Error}*A_i^{Error})*B_{(i-1)}=A_i^{Error-3}$ and $B_{(i-1)}'=Pkt_i'*A_i'=(B_{(i-1)}^{Error}*A_i^{Error})*A_i^{Error-3}=(B_{(i-1)}^{Error}*A_i^{Error})*(B_{(i-1)}^{Error}*A_i^{Error})*B_{(i-1)}=B_{(i-1)}$ are obtained.

That is, since $B_{(i-1)}'=B_{(i-1)}^{Error}$, $B_{(i-1)}'$ and $B_{(i-1)}$ do not actually match. However, since $B_{(i-1)}'=B_{(i-1)}$ of the if statement holds true, $A_i'(=A_i^{Error-3})*B_i$ is transmitted to the communication apparatus A, so that retransmission of $Pkt_i$ (including $B_{(i-1)}$) is performed from the communication apparatus A. In this case, $B_{(i-1)}$ and $A_i$ are Error, so retransmission is not a waste.

Timing at which Arrival of $B_{(i-1)}$ at Communication Apparatus B is Determined As described above, even if $B_{(i-1)}'=B_{(i-1)}$ holds true, when there is an error, retransmission is performed. Thus, arrival of $B_{(i-1)}$ cannot be determined only by holding true of $B_{(i-1)}'=B_{(i-1)}$. In terms of this point, when $B_{(i-1)}'=B_{(i-1)}$ and $B_i'=B_i$ continuously hold true for the return packets to the communication apparatus B, it can be determined that $B_{(i-1)}$ has arrived at the communication apparatus A (same applies to packet A). In other words, ordering needs to be kept in which, $A_i$ that arrives at the communication apparatus B by $Pkt_i$ is normally returned, and the communication apparatus A verifies the return data of $A_i$, and after that, the communication apparatus A transmits $A_{(i+1)}$. Here, an assumption that transmission route Error does not occur continuously is provided. Since this scheme is a protocol assuming a transmission route of high communication quality, there is no practical problem.

In the case of the above-mentioned example, integrity of transfer data is lost only when transmission Error continuously occurs in three packets of $Pkt_i$ transmitted from the communication apparatus A to the communication apparatus B, $Pkt_{(i+1)}$ transmitted from the communication apparatus B to the communication apparatus A, and $Pkt_{(i+2)}$ transmitted from the communication apparatus A to the communication apparatus B.

By the way, in a case where continuous two packets are Error and an error of if statement (determined to match even though not match actually) continues, retransmission becomes unavailable. In order to avoid this, it is necessary to increase the number of times Non-Error packets continue, so that use efficiency of a transmission buffer decreases. That is, the use efficiency becomes penalty cost. It is needless to say that the above-mentioned "waste" occurs. However, since the cause is transmission route Error, it can be considered to be essential traffic.

Compatibility with Unidirectional Communication

In the bidirectional communication, a value of an exclusive OR between transmission target data and return data is used as transmission data. In unidirectional communication, data from the other side is unnecessary. So, by determining it as 0, even if exclusive OR operation is performed, transmission target data and transmission data are the same. In other words, by arranging beforehand that transmission data from the other side is always 0, compatibility between bidirectional communication and unidirectional communication can be ensured. That is, the scheme described in the present embodiment can be similarly applied in the same way without changing the algorithm for bidirectional communication and unidirectional communication.

In the case of unidirectional communication, it is enough to check return data from the other party only once. However, although transmission buffer use efficiency slightly decreases, next return data may be also checked in preparation for bidirectional communication.

By the way, each of the communication apparatus A and B described in the second embodiment receives return data after transmitting data, compares transmitted data with the return data, and determines that the transmission data has arrived at the reception side normally if they match, and performs retransmission if they do not match, like the transmission apparatus 1 of the first embodiment. Thus, each of the communication apparatuses A and B can be read as the transmission apparatus 1. Also, each of the communication apparatus A and B described in the second embodiment receives data and transmits the data to the transmission side as return data like the reception apparatus 2 in the first embodiment.

Thus, each of the communication apparatuses A and B can be read as the transmission apparatus 2.

Apparatus Configuration

Figure 10:
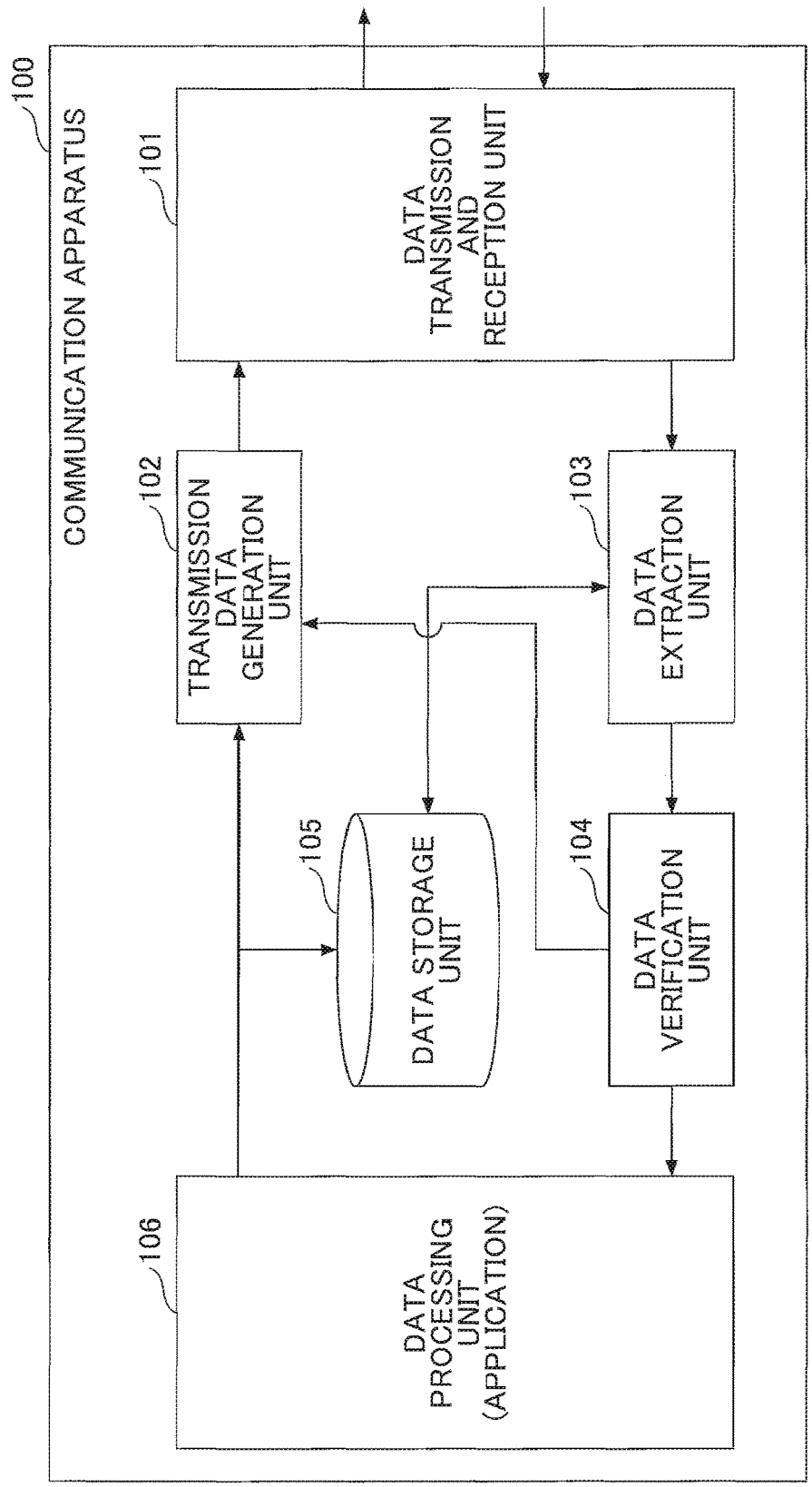
FIG. 10 is a functional block diagram of a communication apparatus 100 that is used as a communication apparatus A or a communication apparatus B in the second embodiment.

FIG. 10 shows a block diagram of a communication apparatus 100 that is used as the communication apparatus A or the communication apparatus B. As shown in FIG. 10, the communication apparatus 100 includes a data transmission and reception unit 101, a transmission data generation unit 102, a data extraction unit 103, a data verification unit 104, a data storage unit 105 and a data processing unit 106.

The data transmission and reception unit 101 performs transmission and reception of packets and the like via a communication circuit. Also, the data transmission and reception unit 101 includes a transmission buffer and a reception buffer. The data processing unit 106 is a functional unit configured to perform generation of data for transmission, and to use received data, and the like, and corresponds to an upper layer communication function or an application that provides a predetermined service, and the like.

The transmission data generation unit 102 receives data, from the data processing unit 106, that is generated by the data processing unit 106 and that is to be transmitted to the other side, and the transmission data generation unit 102 receives data that is to be returned to the other side from the data verification unit 104, and generates data to be transmitted to the other side by calculating an exclusive OR between these pieces of data.

The data extraction unit 103 performs exclusive OR operation based on data received from the other side and data that is stored in the storage unit 105 that has already been received, and extracts the before-mentioned data of A' and B'. As an example, in step S104 of FIG. 9 in a case where the communication apparatus 100 is used as the communication apparatus A, the data extraction unit 103 performs operation of $B_i'=Pkt_{(i+1)}'*A_i$ and $A_i'=Pkt_{(i+1)}'*B_i'$. In this example, $A_i$ is data stored in the data storage unit 105.

The data verification unit 104 performs check, in the above-mentioned example, to check whether $A_i'$ and $A_i$ match. When they match, the data verification unit 104 determines that transmittal confirmation of $A_i$ is obtained, and regards $B_i'$ as $B_i$ to pass $B_i'$ to the data processing unit 106. Or, in order to perform the check more strictly, after $A_i'$ and $A_i$ match, when $A_{(i+1)}'$ and $A_{(i+1)}$ match next, the data verification unit 104 may determine that transmittal confirmation of $A_i$ is obtained, and regard $B_i'$ as $B_i$ to pass $B_i'$ to the data processing unit 106. By the way, the data storage unit 105 may also store data to be held when performing the multi-stage check.

The communication apparatus 100 of the present embodiment can be realized, for example, by causing one computer or a plurality of computers to execute a program which describes the process content described in the present embodiment. More specifically, the functions provided in the communication apparatus 100 can be realized by executing a program corresponding to processes performed in the communication apparatus 100 by using hardware resources such as a CPU, memory and hard disk and the like in the computer. The program can be saved and distributed by recording the program in a computer readable recording medium. (such as portable memory). Also, the program can be provided via a network such as the Internet, an electronic mail and the like.

Summary of the Second Embodiment

As described above, in the present embodiment, there is provided a communication system including a first communication apparatus and a second communication apparatus, wherein the first communication apparatus transmits first data to the second communication apparatus; the second communication apparatus transmits, to the first communication apparatus, third data obtained by superimposing second data on the first data received from the first communication apparatus; and the first communication apparatus obtains the second data from the third data received from the second communication apparatus by using the first data that is held by the first communication apparatus.

The second communication apparatus may be configured to obtain the third data by calculating an exclusive OR between the first data and the second data, and the first communication apparatus may be configured to obtain the second data by calculating an exclusive OR between the first data and the third data.

Also, when data obtained by calculating an exclusive OR between the third data received from the second communication apparatus and the calculated second data is the same as the first data held by the first communication apparatus, the first communication apparatus may estimate that the calculated second data is second data transmitted from the second communication apparatus.

Also, for example, it is assumed that, at the start of communication between the first communication apparatus and the second communication apparatus, data of a value of 0 has already been transmitted from the second communication apparatus to the first communication apparatus without an error, and at the end of communication between the first communication apparatus and the second communication apparatus, the first communication apparatus may transmit, to the second communication apparatus, data obtained by exclusive OR between data of a value of 0 and data that is estimated to be transmitted from the second communication apparatus right before.

Also, according to the present embodiment, there is provided a communication apparatus configured to perform communication with a partner communication apparatus that becomes a communication partner, including: means configured transmit first data to the partner communication apparatus, and receive, from the partner communication apparatus, third data obtained by superimposing second data on the first data; storage means configured to hold the first data transmitted to the Partner communication apparatus; and data obtaining means configured to obtain the second data from the third data received from the partner communication apparatus by using the first data that is held in the storage means.

For example, in the partner communication apparatus, the third data is obtained by calculating an exclusive OR between the first data and the second data, and the data obtaining means obtains the second data by calculating an exclusive OR between the first data and the third data.

When data obtained by calculating an exclusive OR between the third data received from the partner communication apparatus and the calculated second data is the same as the first data held in the storage means, the data obtaining means may be configured to estimate that the calculated second data is second data transmitted from the second communication apparatus.

According to the present embodiment, reachability and integrity of data can be ensured by using return data, so that highly reliable communication becomes possible. Also, since the mechanism such as ACK and window size like TCP is not provided, efficient communication becomes possible from the time of start of communication and from the time of restart of communication, and the like. Further, since return data and original data are superimposed by using exclusive OR and the like to transmit them, it becomes possible to efficiently perform highly reliable communication using return data without affecting throughput adversely.

The present invention is not limited to the above-mentioned embodiments, and various variations and modifications may be made without departing from the scope of the claims.

The present international patent application claims priority based on Japanese patent application No. 2014-077876, filed in the JPO on Apr. 4, 2014 and Japanese patent application No. 2014-151146, filed in the JPO on Jul. 24, 2014, and the entire contents of the Japanese patent application No. 2014-077876 and the Japanese patent application No. 2014-151146 are incorporated herein by reference.

DESCRIPTION OF REFERENCE SIGNS 1 transmission apparatus
11 input unit
12 transmission buffer
13 transmission unit
14 reception unit
15 comparison unit
16 control unit
2 reception apparatus
21 reception unit
22 transmission unit
23 reception buffer
24 output unit
A communication apparatus
B communication apparatus
C communication circuit
100 communication apparatus
101 data transmission and reception unit
102 transmission data generation unit
103 data extraction unit
104 data verification unit
105 data storage unit
106 data processing unit

The invention claimed is:

1. A communication system including a transmission apparatus and a reception apparatus,
the transmission apparatus comprising:
a buffer configured to hold first data to transmit;
a transmitter configured to transmit the first data to the reception apparatus;
a receiver configured to receive second data that the reception apparatus returns; and
processing circuitry configured to
perform a comparison to compare the second data with the first data held by the buffer; and
when a result of the comparison is unmatch, instruct the transmitter to retransmit the first data,
wherein the processing circuitry instructs the transmitter to retransmit the first data when time-out occurs without receiving the second data within a predetermined period.

2. The communication system as claimed in claim 1, wherein the transmission apparatus transmits next first data without waiting return of the second data.

3. The communication system as claimed in claim 2, wherein the number of pieces of the first data to transmit without waiting the return of the second data is determined by a predetermined setting.

4. The communication system as claimed in claim 1, wherein the processing circuitry deletes the first data from the buffer when a result of the comparison is match.

5. The communication system as claimed in claim 1, wherein, after retransmitting first data due to time-out, the communication system waits by performing backoff when time-out also occurs for the first data, and when further time-out occurs, the communication system checks a state of the reception apparatus by another communication method.

6. The communication system as claimed in claim 1, wherein the first data and the second data are transferred by using datagram communication.

7. A transmission apparatus comprising:
a buffer configured to hold first data to transmit;
a transmitter configured to transmit the first data to a reception apparatus;
a receiver configured to receive second data that the reception apparatus returns; and
processing circuitry configured to
perform a comparison to compare the second data with the first data held by the buffer; and
when a result of the comparison is unmatch, instruct the transmitter to retransmit the first data,
wherein the processing circuitry instructs the transmitter to retransmit the first data when time-out occurs without receiving the second data within a predetermined period.

8. A computer-readable recording medium storing a program for causing a computer to function as the transmission apparatus as claimed in claim 7.

9. A communication method performed by a transmission apparatus, comprising:
a step of transmitting, via a transmitter, first data to a reception apparatus;
a step of receiving, via a receiver, second data that the reception apparatus returns;

a step of comparing, by processing circuitry, the second data with the first data; and a step of, when a result of the step of comparing, by the processing circuitry, is unmatch, retransmitting the first data, wherein the method further includes instructing, by the processing circuitry, the transmitter to retransmit the first data when time-out occurs without receiving the second data within a predetermined period.

* * * * *